United States Patent [19]

Fisher et al.

[11] Patent Number: 4,609,181

[45] Date of Patent: Sep. 2, 1986

[54] METHOD OF PULLING OPTICAL FIBER CABLE

[75] Inventors: William C. Fisher, Bothell; Jeffery T. Burns, Marysville, both of Wash.

[73] Assignee: General Telephone Company of the Northwest, Everett, Wash.

[21] Appl. No.: 830,912

[22] Filed: Feb. 18, 1986

Related U.S. Application Data

[63] Continuation of Ser. No. 644,164, Aug. 24, 1984, abandoned.

[51] Int. Cl.[4] .............................................. B65H 59/00
[52] U.S. Cl. ...................... 254/134.3 FT; 254/134.3 R
[58] Field of Search ............... 254/134.3 FT, 134.3 R, 254/134.4; 184/15.1, 16

[56] References Cited

U.S. PATENT DOCUMENTS

| | | | |
|---|---|---|---|
| 3,927,866 | 12/1975 | Linquist | 254/134.4 |
| 4,111,820 | 9/1978 | Conti | 252/49.3 |
| 4,170,673 | 10/1979 | Conti | 427/401 |
| 4,181,137 | 1/1980 | Conti | 137/13 |
| 4,202,530 | 5/1980 | Conti | 254/134.3 FT |
| 4,275,096 | 7/1981 | Taylor | 184/15.1 |
| 4,382,581 | 5/1983 | Wimer et al. | 254/134.3 FT |

OTHER PUBLICATIONS

Olszewski et al, "Development and Installation of an Optical-Fiber Cable for Communications", IEEE Transactions on Communications, vol. 26, No. 7, Jul. 1978, pp. 991–998.

Cannon et al, "Installation and Performance of Chicago Lightwave Transmission System", IEEE Transactions on Communications, vol. 26, No. 7, Jul. 1978, pp. 1056–1060.

Cocito et al, "COS 2 Experiment in Turin: Field Test on an Optical Cable in Ducts", IEEE Transactions on Communications, vol. 26, No. 7, Jul. 1978, pp. 1028–1035.

Basch et al, "Optical Transmission for Interoffice Trunks", IEEE Transactions on Communications, vol. 26, No. 7, Jul. 1978.

O'Mera, "Dual Function Tape Cuts Working Time on Northeast Corridor FO Project", Telephony, May 30, 1983, pp. 59 and 62.

"Polymer Compound Solves Conduit and Duct Lubricating Problems: Oct. 1978 issue of Contractors Electrical Equipment.

Pellan, Instructions and Specifications, 7 pages.

"Fiber Optic Cable Needs the Soft Touch", DA and Engineering Specialties, 11 pages.

"Chance Fiber-Optic (Lightguide-Fiber) Cable Puller", A. B. Chance Co., Apr. 1983, 4 pages.

Primary Examiner—Frederick R. Schmidt
Assistant Examiner—Judy J. Hartman
Attorney, Agent, or Firm—Russell A. Cannon

[57] ABSTRACT

A method is provided for pulling very long lengths of optical fiber and coaxial cable from a single pulling location through a polyethylene or polyvinyl chloride (PVC) subduct which extends continuously between input and output manholes through lengths of buried duct pipe and intermediate manholes. Jacketed aramid fiber pulling tape is located in the subduct with its pulling end extending out of the output end of the subduct and connected to a power driven reel. The other end of the tape extends out of the input end of the subduct and is attached to one end of the cable. Liquid silicone lubricant is poured into the input end of the subduct ahead of the cable. The power drive is energized to cause the reel to move the tape in the subduct for pulling the one end of the cable slowly into and then rapidly through the subduct with less than a prescribed maximum pulling tension on the cable. In an alternate embodiment, the lubricant is silicone grease. In another embodiment, a sponge is attached to the tape in front of the cable for spreading the silicone lubricant over the interior wall of the subduct.

9 Claims, 5 Drawing Figures

METHOD OF PULLING OPTICAL FIBER CABLE

RELATED APPLICATION

This is a continuation of co-pending application Ser. No. 644,164, filed on Aug. 24, 1984 on "METHOD OF PULLING OPTICAL FIBER CABLE," now abandoned.

BACKGROUND OF INVENTION

This invention relates to the placement of optical fiber cable and coaxial cable in conduit and more particularly to an improved method of pulling optical fiber cable into an underground conduit using standard telephone line trucks that do not have to be dedicated to the activity.

With the recognition that optical fiber cables (OFC) would eventually be accepted as a major transmission media for telecommunication systems, cable manufacturers have developed economical high grade optical fiber with an attenuation characteristic (dB of loss per kilometer of length) that is now almost as low as the loss at a splice in an optical fiber. This means that each splice in an optical fiber reduces the overall distance between repeaters by about one kilometer. Optical splices themselves are also costly in terms of labor, equipment and materials. Additionally, each pull of an OFC has fixed set-up charges that are generally unrelated to the length of the cable that is to be pulled. It is desirable therefore to minimize expenses related to and the number of splices in an optical fiber transmission path by pulling longer lengths of cable into cable ducts.

The placement of OFC requires different methods and equipment than are used for placing twisted pair copper conductor cables. This is primarily due to the relatively low value of the maximum pulling tension (600 pounds) prescribed for most OFCs as opposed to an allowable pulling tension of 6,000 pounds for a 1,500 pair copper cable, for example. This limits the maximum length of OFC that can be pulled when the pulling tension in the cable increases with the length of cable that is to be pulled. Additionally, the minimum bending radius for most OFCs is 20 times the cable diameter which is approximately ¾ inch. It is also desirable therefore to pull OFCs rapidly but with as low a pulling tension as is practical and around corners with a large bending radius.

Various techniques for pulling OFC are described in open literature such as "Development and Installation of an Optical-Fiber Cable for Communictions" by J. A. Olszewski, et al, IEEE Transactions on Communications, Volume 26, No. 7, July 1978, pages 991–998; "Installation and Performance of Chicago Lightwave Transmission System"0 by T. C. Cannon et al, IEEE Transactions on Communications, Volume 26, No. 7, July 1978, pages 1056–1060; "COS 2 Experiment in Turin: Field Test on an Optical Cable in Ducts", by G. Cocito, et al, IEEE Transactions on Communications, Volume 26, No. 7, July 1978, pages 1028–1035; "Optical Transmission for Interoffice Trunks", by E. E. Basch, et at, IEEE Transactions on Communications, Volume 26, No. 7, July 1978, pages 1007–1014; and "Dual function tape cuts working time on Northeast Corridor FO project" by S. T. O'Meara, Telephony, May 30, 1983, pages 59 and 62.

As stated in the literature, flexible one inch inner diameter polyethelene pipes or subducts are most often pulled into four inch diameter duct pipes in the ground for housing OFCs. A liquid lubricant (such as liquid vaseline or Hydralube Blue that is manufactured by Arnco Inc., of Youngstown, Ohio) is then inputed into the subduct prior to and/or during the pulling of an OFC for reducing friction. Approximately 9 gallons of Hydralube Blue is normally used for each kilometer of OFC that is pulled in subducts. The use of Hydralube Blue is currently recommended by cable manufacturers for pulling OFCs and is described in the one page article "Polymer Compound Solves Conduit And Duct Lubricating Problems" in the October 1978 issue of Contractors Electrical Equipment and in U.S. Pat. Nos. 4,111,820; 4,170,673; and 4,181,137, all having a common inventor, Alan C. Conti. In a single pull (i.e., from a single pulling point) made by the inventors here with one manufacturer's OFC, only 3,000 feet of cable could be mechanically pulled with a lightweight pulling line before reaching the 600 pound maximum allowable pulling tension, with the average tension being 450 pounds. During this pull approximately 25 gallons of this lubricant was poured ahead of and/or sprayed onto the cable, with some lubricant being introduced into the subduct at the midpoint of the path which was relatively straight except for one small dip and an associated rise near the midpoint. In single pulls of another manufacturer's OFC with the same type lubricant and lighweight pull line, only 2,000 feet of OFC could be pulled before reaching the 600 pound maximum pulling tension over a long time interval of 8 hours and a path that was also relatively straight and contained only minor corner variations. In another case, less than 1,000 feet of the other manufacturer's OFC could be pulled in a long period of time (i.e., 6 hours and over a relatively straight path, except for one each 4 foot radius 90 degree corner, before reaching the 600 pound maximum allowed pulling tension.

In many instances the pulling mechanism includes a stainless steel pulling cable which is heavy, stretchable and abrasive. Since the pulling tension at the winch will be high and variable due to the weight and stretching of the stainless steel cable, the pulling tension on the OFC must be measured at the pulled end of the cable. This is relatively complex and expensive. Also, such a pulling cable is undesirable since it may scratch or even burn holes in the inner diameter of the subduct, thereby increasing frictional forces that impede movement of the OFC in it. Alternatively, polypropylene rope and aramid fiber tape are also described as a pulling line.

Although the desirability of pulling long lengths of OFC is widely acknowledged, single pulls of OFCs are normally running less than 2,000 feet. Although the pulling of continuous lengths of OFC of as much as 5,000 feet are reported, all of those known to the inventors here require intermediate assistance in the pull and are done with pulling tensions approaching the maximum allowable value thereof. Stated differently, this can mean stationing a human operator in each manhole and having all of the operators simultaneously pull on the cable so that only a short length of cable is being independently pulled from any pulling location. This was the case for the previously reported longest pull of OFC of 5,000 feet in Hawaii which required 38 people. Also, this is one of the ways of pulling OFC that is recommended by cable manufactures, where a crew of 10 people is suggested for pulling up to 1,500 feet of cable through ducts and manholes. For pulls of greater than 1,500 feet, it is recommended that excess cable be pulled out of the 1,500 foot manhole and laid on the ground. The excess cable is then reintroduced into the duct at the 1,500 foot manhole (after the pulling crew has moved up to new manholes) and the pull process repeated for the next 1,500 feet. This requires considerable time in man hours of labor and it is unknown what bending radius or tension is put on the cable by individuals doing the pulling. Alternatively, portable mechanical puller units can be located in manholes at 1,500–2,000 foot intervals where the pull line and/or OFC makes a couple of turns around a large diameter capstan before going on into the next length of duct. All of these units operate simultaneously for pulling a long-continuous length of OFC by means of a series of pulls of short (e.g., 1,500 foot) lengths of cable. This latter method requires 9 or 10 human operators and is therefore costly in terms of both capital equipment and the number of manhours involved in a pull. Additionally, such equipment is generally heavy and bulky so as to require a number of people to move it around, and other equipment requires a vehicle(s) dedicated to the pulling of such cable.

An object of this invention is the provision of an improved method of pulling continuous long lengths of OFC.

Another object is the provision of an improved method of pulling OFC that may be practiced with a standard utility line truck that does not have to be dedicated to such an activity.

SUMMARY OF INVENTION

In accordance with this invention a method of pulling cable through an inaccessable elongated duct that is provided for supporting a plurality of cables, that may be other than straight, and that may be severed at points along it's length between input and output ends thereof for providing access to it's interior, comprises the steps of: locating a subduct in the duct so as to extend continuously from the input end to the output end thereof; locating an aramid fiber pulling means in the subduct with its pulling end extending out of an output end of the subduct and its other end extending out of an input end of the subduct; coupling the pulling means to a tensiometer near the pulling end of the former; connecting the pulling end of the pulling means to a power driven reel; connecting the other end of the pulling means to one end of the cable with an appropriate attachment mechanism; first inserting a silicone lubricant into the input end of the subduct; energizing the power drive on the reel for slowly moving the pulling means through the subduct; inserting the one end of the cable into the input end of the subduct; and causing the reel to pull the pulling means through the subduct with less than a prescribed tension thereon. In a preferred method, the lubricant is liquid silicone. The liquid silicone may be inserted into the subduct ahead of the cable and/or during the pulley process.

DESCRIPTION OF DRAWINGS

This invention will be more fully understood from the following detailed description of preferred embodiments thereof, together with the drawings which are not drawn to scale and in which.

DESCRIPTION OF PREFERRED EMBODIMENTS

Figure 1:
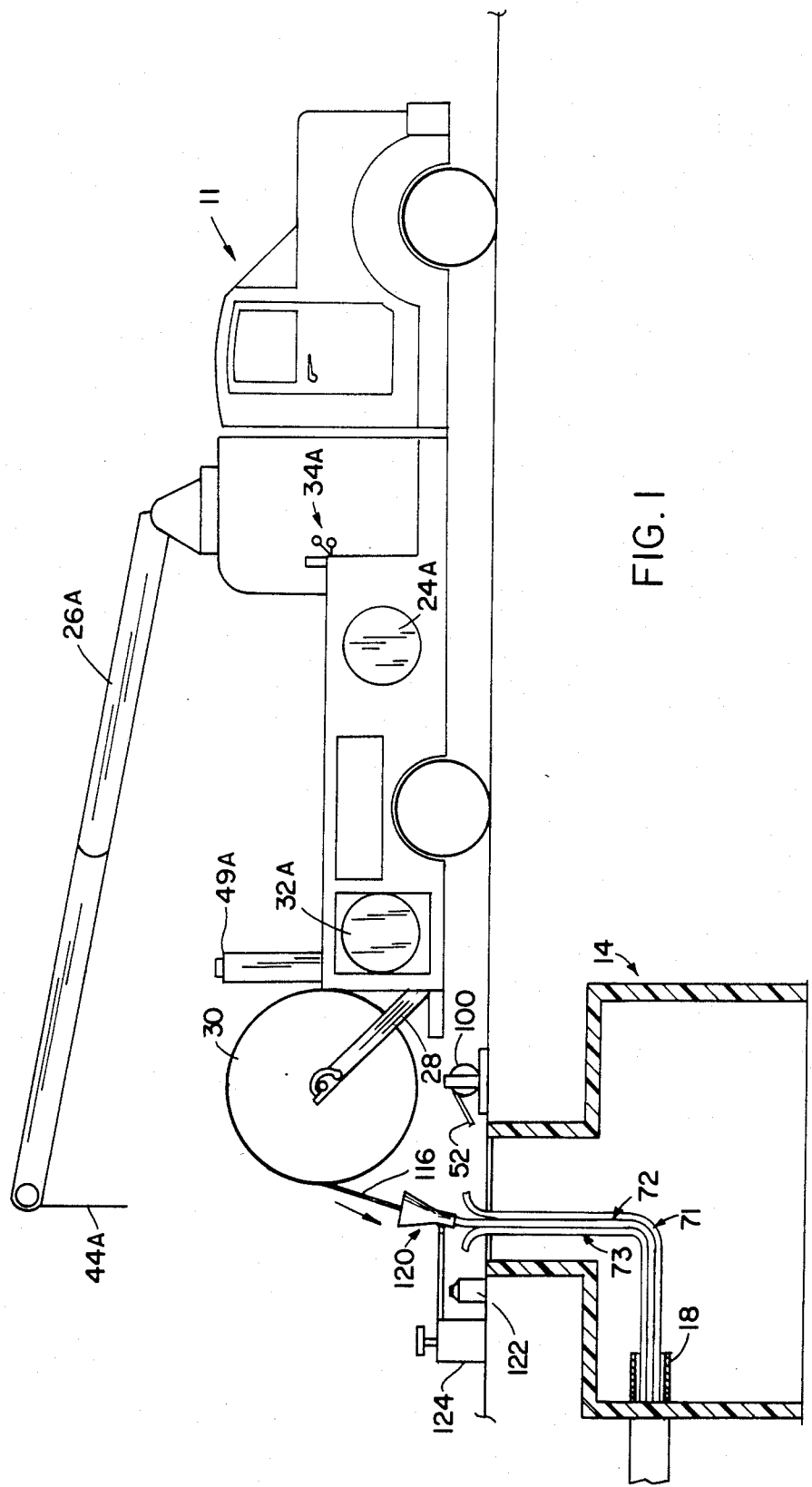
FIGS. 1 and 2 are diagramatic representations of standard telephone line trucks 11 and 12 located for pulling OFC into a subduct extending between a pair of man-holes 14 and 16.
Figure 2:
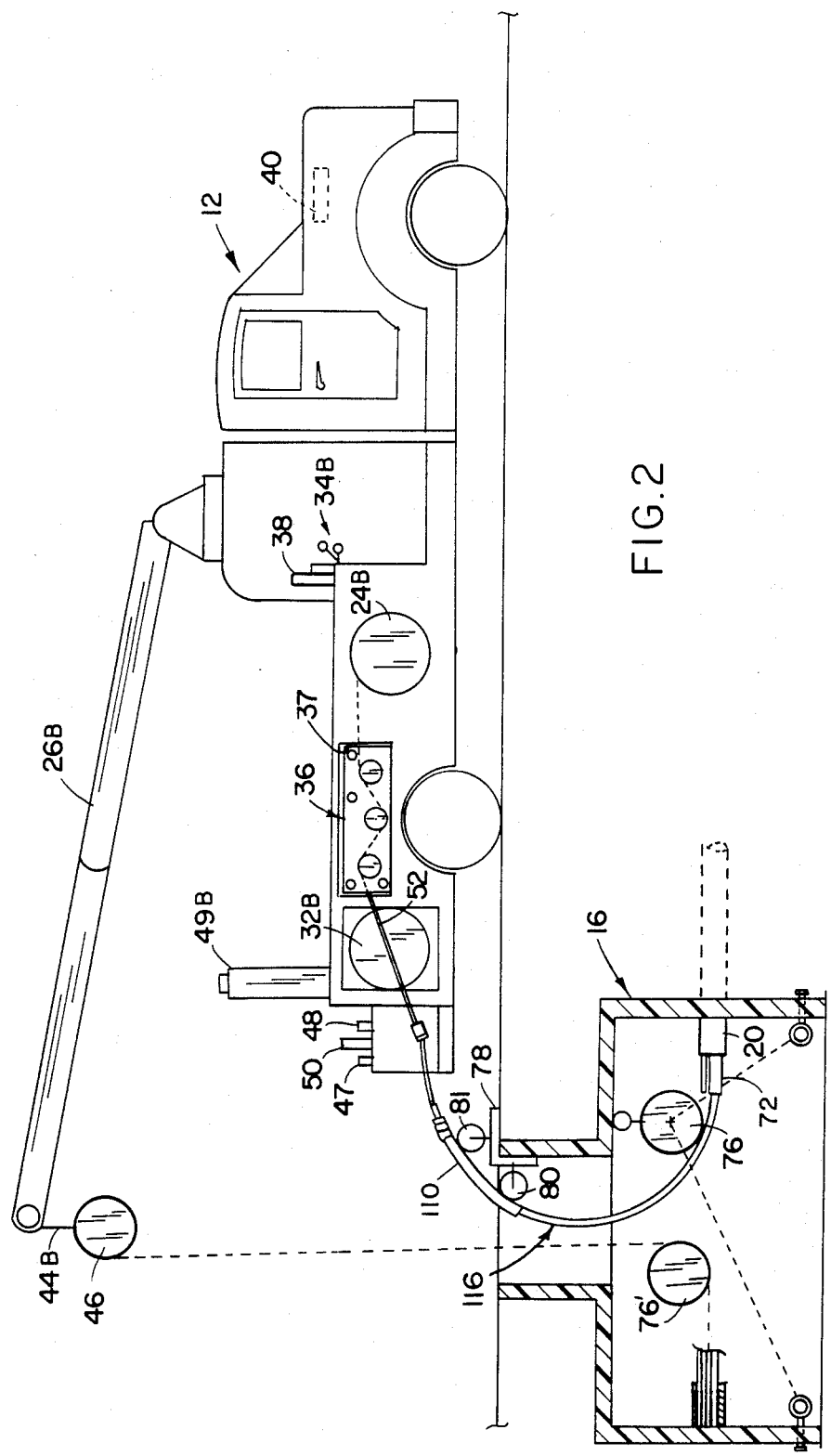

Referring now to FIGS. 1 and 2, standard telephone line trucks 11 and 12 are shown in position for pulling OFC between man-holes 14 and 16, which are shown here in section. In a typical telephone system there are a number of man-holes, typically spaced 600 feet apart, which are not shown for convenience of illustration, between the feed and pulling ends or locations in FIGS. 1 and 2. Four inch ducts 18 and 20 are buried in the ground and extend in generally straight lines between adjacent manholes. Although the ducts may curve around corners or up and down for dips and rises in the terrain, such changes in direction are normally gradual in nature and their locations are known. Some ducts in which OFC is to be pulled may already contain copper telephone cables.

The telephone line truck 11 is standard and has a take-up reel 24A for pulling lightweight lines and loads, a boom 26A for lifting heavy items, a winch on the end of the boom for pulling heavy loads, a hydraulically operated capstin 28 for holding a roll 30 of cable, an air compressor 32A, and a control panel 34A including levers for controlling various items on the truck such as the capstin, boom, air compressor, and take-up reel. In practice, the truck's motor is running for powering the hydraulic mechanism for running the boom, castin, air compressor, take-up reel, etc. The truck 12 at the pulling end is similiar, except that it also includes a slide-mounted dynamometer assembly 36, a meter panel 38, and a printer 40 which may be stored in the cubby hole of the truck. Radio communication is provided between the two trucks. In accordance with this invention, only two telephone line-men are required at each truck during the pulling of OFC. Linemen are not normally required at intermediate manholes.

Figure 3:
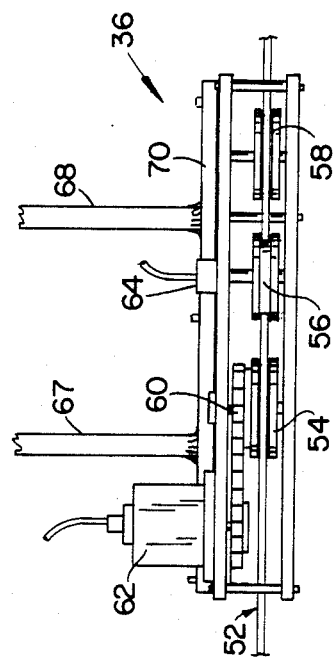
FIG. 3 is a top view of apparatus 36 for measuring tension on a pulling tape 52, and thus the OFC, the rate of a pull, and the current length of a pull.

The tensiometer unit 36 is a 3-wheel device which is shown in more detail in FIG. 3. The pulling end of a tape 52 that is used to pull an OFC is threaded over the top of the first (left) wheel or roller 54, under the second (middle) roller 56 and over the top of the third (right) roller 58 before being attached to the take-up reel 24B on the truck in FIG. 2. A sprocket 60 on the first wheel 54 chain drives an optical shaft encoder apparatus 62 for sensing the rate and speed that the tape is pulled through the unit. The outside rollers 54 and 58 are preferably offset from the center roller. A pin load cell unit 64 is associated with the axel of the center roller 56 for sensing the tension on the tape, and thus the OFC, that is being pulled by the tape. It should be noted that the OFC never goes through the rollers of the unit 36. Components of the tensiometer unit may be powered by the 12 volt battery of the truck. Tensiometers of the type illustrated in FIG. 3 are commercially available from Tri-coastal Industries, Inc., Seattle, Wash.

Electrical signals are fed from the encoder 62 and cell 64 to the printer 40 and meter panel 38 which provide hard copy and visual indications of the speed, distance and tension of a pull on associated digital or needle type meters. The printer can be set to print hard copy of the tension, speed and length for every 5, 10 or 20 feet of a pull, for example. A switching means (not shown) that is wired in series in the ignition system of the truck is also driven by the tension output signal of the pin load cell 64 for opening the switching means and thus the electrical system of the truck for shutting down the system if and when the pulling tension on the tape exceeds a prescribed value that is set by an adjustment on the panel.

The tensiometer assembly 36 is preferably slide mounted in a side bin 37 of the truck 12 or on the right side of the rear of the bed of the truck. This is accomplished by welding a first pair of heavy rectangular channels 47 and 48 to the bed of the truck or the floor of the bin 37 and the ends of a second pair of rectangular channels 67 and 68 to a plate 70 which is bolted to the back side of the tensiometer. The second channels on unit 36 slide into associated first channels in bin 37 for supporting the unit 36. The tensiometer may be slid part way out of the bin 37 when it is needed, with bolts or butterfly nuts fixing the position of the unit 36. The assembly 36 is merely pushed back into the bin and locked down by the bolts when the truck is to be moved. Alternatively, the channels on the tensiometer 36 may be slid into the channels 47-48 on the rear bed of the truck (see FIG. 2) when the tensiometer is to be used and set into the bed of the truck when it is being moved to another location or used for a different task. In practice, the tensiometer 36 is physically much smaller than is shown in FIG. 2.

In preparation for pulling an OFC, subducts 71-73 are located in the ducts. The subducts are preferably polyethelyene tubing which comes in rolls and preferably has a one inch inner diameter. This tubing comes in black and orange and the latter is preferred since the interior surface thereof is believed to have a lower coefficient of friction than that for the other tubing. The subducts are placed by wrapping a plurality of them together and pulling or pushing them through the ducts, in the conventional manner, from the manhole 14 to an intermediate manhole. Stated differently, the subducts preferrably extend continuously through intermediate manholes. The placing of subduct tubing is limited to lengths of approximately 1300 feet because of pull down or stretching of the tubing when long lengths thereof are pulled. In this operation, a human operator must go to each intermediate manhole during a pull to be sure that the subduct extends across the manhole and into an associated duct. Other lengths of tubing are sequentially pulled into the ducts from intermediate manholes, with ends thereof being joined together in the intermediate manholes with smooth interior surfaces. An extra length of subduct is left on the input end thereof in the feed manhole 14 for acting as an input funneling mechanism.

A pulley 76 is also rigidly suspended in the output manhole 16 by chains and/or cables and turnbuckles. The radius of the pulley 76 is greater than 20 times the diameter of the OFC so that optical fibers are not damaged by bending as the cable moves over this pulley. Also, an angle iron plate 78 supporting a pair of pulleys 80 and 81 is located on the top edge of the take up manhole 16 for preventing lines and tapes rubbing on the edge of the manhole. The OFC normally does not extend over the pulleys 80-81, although this is permissible if they have a sufficient diameter.

Figure 4:
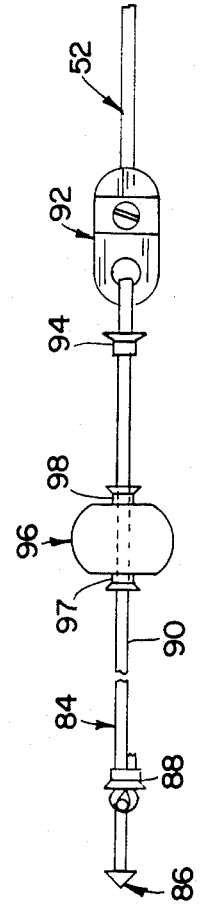
FIG. 4 is a plan view of a threading line 84 that is to be blown into the subduct and it's connection to a pulling tape 52.

A small lightweight threading line 84 is blown into the subduct with a commercially available pneumatic gun (not shown) in the conventional manner. The line 84 may be way of example be a lightweight nylon rope. This is readily accomplished by attaching a dart 86 (shaped like an umbrella) in FIG. 4 or mouse (such as the sponge means 96 there) to one end of the line 84 with a clamp 88 or knot, inserting the dart into the open end of the tubing 72 at manhole 14, attaching the pneumatic gun to the same end of the subduct, and passing pressurized air from the compressor 32A into the subduct. This blows the dart down and pulls the line 84 through the subduct to the output end thereof at manhole 16. After removing the dart from the line 84, the output end thereof is secured onto the take-up reel 24B on the truck in FIG. 2.

In accordance with one aspect of this invention, the cable pulling line 52 for actually pulling the OFC into the subduct is preferably a single length of synthetic aramid fiber tape which exibits very little stretch when it is under tension, that has a breaking strength of much greater than the 600 pound maximum pulling force for OFC, and which preferrably has a clear plastic outer coating for reducing friction between it and the subduct. A pulling tape that has been successfully used to pull OFC in lengths of greater than has previously been reported is Muletape, manufactured by the New England Printed Tape Co., Pawtucket, R.I. This tape is believed to be made of Kevlar aramid fibers manufactured by E. I. DuPont de Nemours and Company of Wilmington, Del. and coated with a clear plastic urethane jacket for reducing friction. One high strength DuPont fiber is polyphenylene terephthalamide poly fiber described in U.S. Pat. No. 4,148,164. Jacketed Muletape is obtainable with a breaking strength of 1500 pounds, a maximum stretch of $2\frac{1}{2}\%$ up to 1500 pounds, a low (0.45) coefficient of friction, cross-sectional dimensions of only 0.026 inch by 0.5 inch, and a weight of only 10 pounds per thousand feet in one inch widths. A 6,500 foot roll of this tape is about 12 inches long and 12 inches in diameter.

A mechanical connector 92 is attached to the pulling end of the pulling tape 52 for making a connection thereto. The connector 92 preferably has smooth-rounded corners and a diameter that is less than the ID of the subduct. The connector, may by way of example, be a Muletool connector, manufactured by the New England Printed Tape Company, infra. The end 90 of the threading line at the feed manhole 14 is attached to the pulling tape 52 by threading the line 84 through the eye in connector 92 and back on itself, and then securing the two lengths of line together with a crimp fastner 94. Alternatively, the line 84 may be tied onto the connector 92 or held onto the connector 92 with a knot. A crushable sponge means 96 having a diameter that is somewhat greater than the inner diameter of the subduct may be attached to the line 84 in front of the connector 92 with crimp connectors 97-98 or black electricians tape. The diameter of the sponge may actually be much greater than the ID of the subduct as long as it is not so big that it inhibits movement of it and the tape and cable through the subduct. Alternatively the diameter of the sponge means may be slightly less than the inner diameter of the subduct.

After energizing the tape up reel 24B for slowly pulling the line 84 and then inserting the sponge means 96 and adjacent connector 92 into the input end of the subduct 72, the speed of the take-up reel is increased to around 150 feet per minute for pulling tape off of the reel 100 (see FIG. 1) and through the subduct. After several turns of tape 52 are wound onto the take-up reel 24B in FIG. 2, the system is shut down, the tape is unwound from the take-up reel, the sponge means and connector are cut off of the associated lines, and the threading line is tied off and removed from the take-up reel. The pulling or free end of the tape is then threaded through rollers of the tensiometer and attached to the take-up reel 24B. The sponge means 96 can operate for sweeping clean the inner diameter of the subduct and keeping any crimp connectors from contacting and scratching the surface of the subduct. Nylon coated aramid fiber rope is not recommended as the pull line since it was found to burn itself into the subduct.

Figure 5:
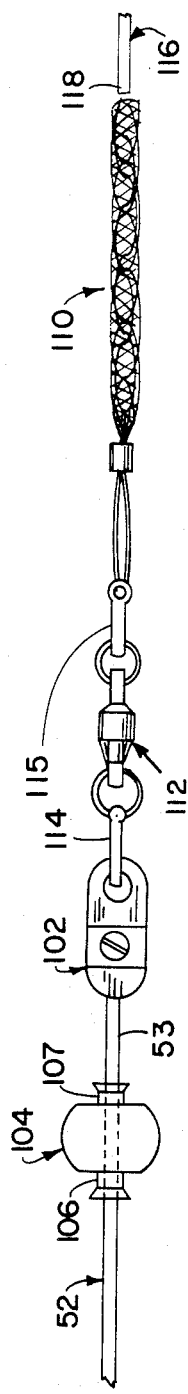
FIG. 5 is an exploded view of a synthetic aramid fiber pulling tape 52, connector 102, and pulling sock 110 prior to the pulling end 118 of an OFC 116 being inserted into and seized by the pulling sock.

The remaining tape is then played off of the spool 100 if the right amount of tape is provided there, or the tape is cut off of the spool to a desired length (see FIG. 1). A Muletool connector 102 (see FIG. 5) is then attached to the end 53 of the tape. In accordance with another aspect of this invention, another sponge means 104 is attached to the tape 52 a short distance (such as two feet) ahead of the connector 102 by crimp connectors 106–107 or black electricians or vinyl tape. The connector 102 and a metal pulling sock 110 are then attached to opposite sides of a ball bearing mounted swivel 112 such as a deep sea fishing swivel with schackles 114–115. This swivel operates to substantially reduce twisting of the tape as it pulls OFC through a subduct. The free end 118 of the OFC 116 on the reel 30 is then pushed into the sock 110 which is collapsed and clamped onto it. The pulling sock is a standard cable pulling grip which is similiar to a torture tube which grips a device inside it (e.g. fingers) more securely as one tries to pull the device out of the sock. After the sock is cinched down onto the polyethelene sheathing of the OFC, the sock is covered with electricians tape or vinyl tape or a quick drying liquid plastic for providing a smooth surface which can move in the subduct without scaring the interior surface thereof. A split collar 120 having nozzles around the circumference therof (such as is manufactured by ARNCO, infra) is then attached to the input end of the subduct 72.

It has been discovered that the pulling of OFC in subduct is greatly facilitated and vastly improved when the subduct is lubricated with a silicone lubricant of the organopolysiloxanes prior to moving the OFC into the subduct. In accordance with a preferred method of this invention, a liquid silicone lubricant is poured from gallon jugs 122 into the funnel top of the collar 120 or pumped from a tank 124 into the collar ahead of the OFC at the rate of about 1 gallon per 1,000 feet of subduct 72. The lubricant may be of the dimethyl or methylphenyl, for example, families. The liquid silicone may be mixed by volume with a solvent or vehicle such as water or triethane which is one of the least toxic of the chlorides and that will not adversely affect the polyethylene subduct and sheath on the OFC. The liquid silicone may, for example, have a viscosity of 1000 c.s. The liquid lubricant may, by way example, be Magna-Lube which is manufactured by Magnolia Chemical Company of Dallas, Tex. Alternatively the lubricant may be a silicone grease.

In accordance with a preferred method of this invention that was used to pull an OFC that was approximately 5,000 feet in length, 3 gallons of liquid silicone is poured into the funnel portion of the collar so as to saturate the sponge 104 and provide liquid lubricant running ahead of the OFC. The take-up reel 24B in FIG. 2 is then energized and the sponge means 104, connector 102, sock 110 and OFC are consecutively fed into the subduct, with the tank 124 spraying liquid silicone onto all of these parts as they move into the subduct. The saturated sponge means 104 operates to coat all or at least the bottom and parts of the side walls of the interior of the subduct as it moves along ahead of an OFC. As the OFC moves further into the subduct, the sponge means 104 picks up the liquid silicone that was previously poured into the subduct and spreads it continuously over the length of the subduct. The OFC is pulled slowly into the subduct for the first fifty feet or so. With this much OFC in the subduct, the pulling tension has been found to decrease gradually and the rate of pull is increased to and continued at approximately 175 feet per minute as the operator watches the tension meter. During this period, liquid silicone is intermittently or periodically sprayed onto the circumference of the OFC as it moves into the subduct.

Although the tension threshold device is set to about 500 pounds, the operator continuously monitors the tension and slows down the pull if the tension exceeds approximately 300 pounds. When the distance meter indicates that the input end of the OFC is near a known dip or curve in the subduct, the operator on the truck 12 can gradually decrease the rate of pull while watching the reading on the tension meter increase. Once the pulling end 118 of the cable and associated parts 102–115 move past the discontinuity in the subduct, the tension has been found to again drop so that the rate of pull can be increased. This method of operation makes it possible to pull OFC without periodically subjecting it to dramatic changes in pulling tension. Additionally, the pulling tension with this method has been found to decrease as additional length of cable is pulled into the subduct, which is contrary to what is reported elsewhere for other pulling methods, except during movement of the pulling end past or through a discontinuity.

A marker is attached to the tape 52 a prescribed distance in front of the pulling end 118 of the OFC for visually indicating where the end of the tape is and when the OFC will emerge from the subduct. When the marker passes out of the manhole 16 in FIG. 2, the rate of pull is dramatically decreased until the OFC passes out of the subduct and reaches the pulley 80 in FIG. 2. At this point, the shackle 115 is removed from the pulling sock, the boom 26 is lowered to the support plate 49, and a hook on the winch cable 44 is connected to the eye on the pulling sock. The winch is then energized to pull the hook up to the end of the boom which is raised and extended for pulling an extra 25 feet of cable out of the subduct to provide sufficient length for trimming and making a subsequent splice. The boom is then lowered and retracted, and the winch line disconnected from the cable which is rolled up and placed in the manhole 14 until it is time to make a splice there. The tape 52 may be removed from the take-up reel 24B and subsequently rewound onto the spool 100 for use in another cable pull. It has been determined empirically that approximately one gallon of liquid silicone per one thousand foot of subduct is adequate for pulling OFCs with a tension of much less than the maximum allowable 600 pounds. All or about half of the lubricant may be poured into the subduct ahead of the cable and the other half sprayed or poured or extruded (grease) onto the cable during the pull. With ones of these apparatus and method, OFC has been pulled further and faster from a single pulling location and with lower tension than has been previously known or reported.

In an alternate method of practicing this invention in which the OFC is preferrably pulled within 24 hours after placing the pulling tape in the subduct, liquid silicone saturates the sponge means 96 and/or is poured (one gallon for every 3,000 feet of subduct) into the subduct ahead of the sponge means and tape for spreading this lubricant over the interior surface of the subduct. This same method is repeated immediately prior to pulling the OFC into the subduct. Also, the threading line may be dispensed with entirely and the tape blown through the subduct with a cone on it, with or without liquid silicone. Further, the subduct may be opened at an intermediate manhole and the line or tape blown further from that location if the subduct is exceptionally long. Alternatively, a sponge means may be connected to the input end of the tape, instead of the connector 92 and threading line 84, and used for blowing the tape through the subduct. Additionally, the threading line or tape can be blown in with or without liquid silicone from the manhole 16 in FIG. 2 at the take-up end. Further, an OFC containing continuous aramid fibers such as strands of Kevlar that are bonded to the inside of the sheath, preferably over the length of the cable, a length of the sheath may be removed to expose the Kevlar strands at the one end of the cable. The optical fibers are then cut back and taped, and the Kevlar strands are tied together in a knot. The shackle 115 then connects the swivel 112 to the Kevlar strands for making an integral assembly which is pulled through the subduct. Also, all of the silicone (except for coating the connector 102 and sock 110) may be poured into the subduct ahead of the OFC since it is believed to be more important to coat the subduct with this lubricant than the circumference of the cable. Additionally, the subduct may be opened at intermediate manholes and more silicone lubricant added for a discontinuity or a high point or an extra long pull, although this has not been found necessary. Also, this method is applicable to pulling of other types of cable such as coaxial cable and copper wire telephone cables.

This method has been successfully employed in pulling a 5500 foot length of OFC at a maximum speed of 160 feet per minute and a maximum pulling tension of 200 pounds in only forty minutes. The subduct for this pull was fairly straight although it had two substantial dips in it near the end thereof. In another pull of approximately 4300 feet of OFC, the pulling speed was again 160 feet per minute with a maximum tension of 200 pounds that occurred when the pulling end of the cable went around a 90 degree bend having a 4 foot radius. The tension decreased substantially to approximately 100 pounds after the pulling end of the cable cleared the bend. In each of these pulls, the tape was new and put into the subduct with liquid silicone immediately prior (within 24 hours) to pulling the OFC. In another cable pull of approximately 5400 feet in length, a tape that had been previously used for pulling OFC was pulled into the subduct with liquid silicone approximately three days prior to this pull. The OFC was pulled over a path that was relatively straight except for two dips near the middle thereof, the nominal pulling tension being about 250 pounds at about 100 feet per minute and increaseing to approximately 300 pounds at a pull rate of 250 feet per minute. The tension increased to a maximum of around 350 pounds near the dips. This increased pulling tension is believed to have been caused by the excess liquid silicone drying on the inner wall of the subduct and/or reacting with the plastic coating on the tape so that the tape had a tendency to stick to the subduct since it sat in this condition so long before the cable pull. It is therefore recommended that the tape not be pulled into the subduct with liquid silicone or other lubricant if there is to be a delay of more than 24 hours before pulling an OFC. In most pulls of OFC of approximately 3,000-4,000 feet in length, the pulling tension has been 80 pounds or less using this method. Calculations show that a 13,000 foot length of OFC can be pulled from a single location over a fairly straight path of subduct, without using figure-eighting of the cable or split reels which would increase the possible continuous length of pulled OFC that does not contain a splice even further.

Although this invention is described in relation to preferred embodiments, variations and modifications are possible. By way of example, the tape fibers may be covered with a polyethylene jacket for further reducing the friction between it and the subduct. Also, the pulling line may be aramid fiber in a rope form that is jacketed with a low friction material such as polyethylene. Liquid silicone lubricant is suggested for pulling such an aramid rope, however, since such a rope is in more intense contact with the surface of the subduct and may tend to burn the latter if it is moved too fast or without this lubricant. Additionally, the truck 12 may have a large diameter pulley 46 on the winch line 44 (see FIG. 2), with the pulley 46 being lowered to the level of the truck bed and channels 47-48 during an OFC pull. The tape 52 then extends out of the subduct, over the pulleys 76' and 46, through rollers of assembly 50 and the tensiometer, and into the take-up reel 24B. When the pulled OFC reaches the assembly 50, the boom and winch line are raised for pulling additional cable out of the manhole 16 that is required for a subsequent splice as is shown in FIG. 2 in association with the pulley 76'.

The scope of this invention is therefore to be determined from the attached claims rather than the aforementioned detailed description of preferred embodiments thereof.

What is claimed is:

1. The method of pulling optical fiber cable having a maximum tensile-strength limit of 600 lbs. through an underground duct means having a length greater than 4000 feet consisting of the steps of:
   disposing within the entire length of said duct means a continuous polyethylene hollow tubular subduct having an entry end and an exit end;
   inserting in said subduct from the entry to the exit ends thereof a polyethylene-covered pulling tape having a leading end and a trailing end;
   securing to said tape proximate to the trailing end thereof sponge means having an uncompressed outside diameter greater than an inside diameter of said subduct whereby to engage an interior surface of said subduct when disposed therewithin;
   connecting the trailing end of said tape to one end of said cable;
   injecting into said subduct ahead of said sponge means and prior to movement of said cable into the subduct a lubricant consisting of a mixture of silicone and triethane and having a viscosity of approximately 1000 c.s.;
   unassistedly pulling the leading end of said tape with a force less than 600 lbs. and at a maximum velocity greater than 100 feet per minute and thereby moving more than 4000 feet of the cable through the subduct with a pulling-induced tensile force of less than 600 lbs., said sponge means applying said lubricant substantially uniformly to the interior surface of said subduct immediately prior to movement of said cable therethrough, and disconnecting said trailing end of the tape from said one end of said cable.

2. The method of pulling optical fiber cable having a length greater than 4000 feet and a maximum tensile-strength limit of 600 lbs. through underground duct means having a length greater than 4000 feet, consisting of the steps of:

disposing within said duct means more than 4000 feet of a continuous polyethylene hollow tubular subduct having an entry end and an exit end;

inserting into said subduct a pulling tape having a leading end and a trailing end;

securing to said tape lubricant applying means having an outside diameter approximating the inside diameter of said subduct;

connecting the trailing end of said tape to one end of said cable;

injecting into said subduct ahead of said applying means and prior to movement of said cable into the subduct a liquid silicone lubricant;

unassistedly pulling the leading end of said tape with a force less than 600 lbs. and thereby moving more than 4000 feet of the cable through the subduct with a pulling-induced tensile force in the cable of less than 600 lbs., said applying means spreading said lubricant substantially uniformly to the interior surface of said subduct immediately prior to movement of said cable therethrough; and disconnecting said trailing end of the tape from said one end of said cable.

3. The method according to claim 2 in which said length of each of said subduct and said cable is greater than 5000 feet.

4. The method of installing underground optical fiber cable capable of unassisted pulls of greater than 4000 feet and with a predetermined maximum tensile-strength limit through underground subduct having a length greater than 4000 feet and having an entry end and an exit end, consisting of the steps of:

inserting in said subduct a pulling tape having a leading end and a trailing end;

connecting the trailing end of said tape to one end of said cable;

injecting into said subduct prior to movement of said cable therewithin a silicone-based lubricant;

uniformly applying said lubricant to an interior surface of said subduct;

unassistedly pulling the leading end of said tape and thereby moving said cable through the subduct with a pulling-induced tensile force in the cable of less than said limit; and disconnecting said trailing end of the tape from said one end of said cable.

5. The method of pulling optical fiber cable capable of unassisted pulls of greater than 3000 feet and having a predetermined maximum tensile-strength limit through an underground plastic subduct with a length greater than 3000 feet and having an entry end and an exit end, consisting of the steps of:

injecting liquid silicone lubricant into said subduct;

applying said lubricant to an interior surface of said subduct; and unassistedly pulling said said cable through an entire length of the subduct with a pulling-induced tensile force of less than said limit.

6. The method of pulling more than 4000 foot lengths optical fiber cable having a maximum predetermined tensile-strength limit through an underground duct means having a length greater than 4000 feet, said cable having a leading end, consisting of the steps of:

disposing within the entire length of said duct means a continuous plastic hollow tubular subduct having a length greater than 4000 feet and having an entry end and an exit end;

injecting into said subduct a liquid silicone lubricant;

applying said lubricant to an interior surface of said subduct; and unassistedly pulling the leading end of said cable with a force less than said limit and moving said leading end thereof through the entire length of the subduct with a pulling-induced tensile force in the cable of less than said limit.

7. The method of pulling through a subduct an optical fiber cable greater than 4000 feet in length having a predetermined maximum tensile-strength limit, consisting of the steps of:

injecting a silicone-based lubricant into said subduct;

applying said lubricant to an interior surface of said subduct; and unassistedly pulling said cable with a force less than said limit through the entire length of said subduct.

8. The method according to claim 7 in which said lubricant is liquid silicone.

9. The method according to claim 7 in which said lubricant is a liquid comprising a mixture of silicone and triethane.

* * * * *